A. M. MIDGLEY AND S. SUNDERLAND.
CUTTER FOR HELICAL WHEEL TEETH.
APPLICATION FILED SEPT. 13, 1918.

1,307,633.  Patented June 24, 1919.

Inventors
Sam Sunderland
Arthur Maurice Midgley
by Spear, Middleton, Donaldson & Spear
Attys

# UNITED STATES PATENT OFFICE.

ARTHUR MAURICE MIDGLEY, OF SUTTON-CRAVEN, NEAR KEIGHLEY, AND SAM SUNDERLAND, OF KEIGHLEY, ENGLAND.

CUTTER FOR HELICAL WHEEL-TEETH.

1,307,633.   Specification of Letters Patent.   Patented June 24, 1919.

Application filed September 13, 1918. Serial No. 253,964.

*To all whom it may concern:*

Be it known that we, ARTHUR MAURICE MIDGLEY, a subject of the King of Great Britain and Ireland, residing at Holly Bank, Sutton-in-Craven, near Keighley, and SAM SUNDERLAND, a subject of the King of Great Britain and Ireland, residing at High Utley, Keighley, in the county of York, England, have jointly invented a certain new and useful Improvement Relating to Cutters for Helical Wheel-Teeth, of which the following is a specification.

This invention relates to the construction of cutters suitable for cutting the teeth spaces of double helical wheels, and has for its object the simplification of construction, so that the cutting surfaces are more readily ground and thereby sharpened, by arranging each cutter tooth detachably, and securing same in a cutting position, in such a manner that, should one of the series of cutter teeth be broken, it can be removed and another substituted, without discarding the remainder, which according to the present construction has hitherto been the practice.

Figure 1:
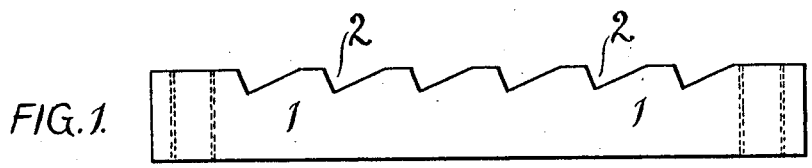
Figure 2:
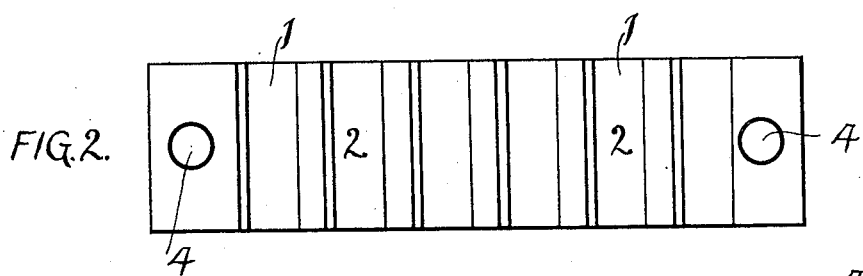
Figure 3:
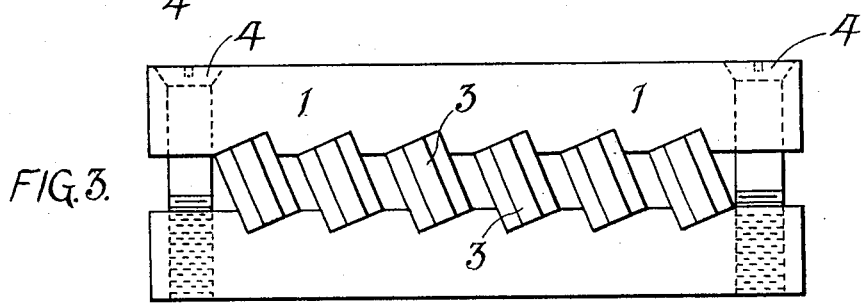
Figure 4:
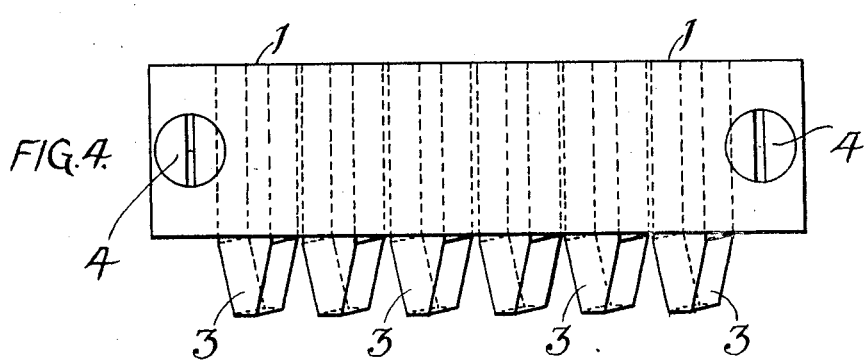
Figure 5:
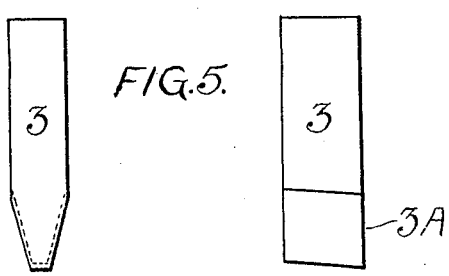

In describing our invention in detail, reference is made to the accompanying sheet of drawings, in which Figure 1 represents a view of a serrated plate used in duplicate for housing detachable cutters. Fig. 2. is an elevation showing the serrated side of one of the plates. Fig. 3. is an end view showing the manner in which a series of detachable cutters are housed. Fig. 4. is a front view of same, and Fig. 5. represents a front and side view respectively of a detachable tooth.

In carrying out our invention, we utilize two bars indicated by the numeral 1. each cut on one side with angular grooved serrations 2. of such distance apart, as to correspond with the pitch of the wheel teeth to be cut.

Into these serrations the cutters 3 are placed and secured in the desired position on the tightening of screws 4. holding the cutters sufficiently rigid until placed in a tool box of the ordinary construction where they are more firmly held by screws as applied when securing cutters of the racktype of ordinary construction.

The series of cutters 3. of the rack type, are placed vertically in the wheel cutting machine, and operated in a manner such as described in United States of America Patent No. 1,090,350. issued to Sunderland, March 17, 1914 in which two series of cutters are used integral with plates, each plate carrying a series of cutter teeth, one series inclining to the right, and the other to the left, secured in respective tool boxes and reciprocated in guide ways at the same inclined angle as the teeth of the double helical teeth when cut.

By forming detachable cutters 3 and housing them in serrated grooves 2. such as described, the cutting surface of each tooth 3 is straight, and at right angles to the path of the reciprocating tool-boxes and cutters, so that it will be obvious the whole series of cutters housed in the manner described, can be removed and sharpened on the flat surface 3A. on application to an ordinary rotating grind-stone or the like, instead of having to use a special device to grind the cutting face, which is indented to an extent that said cutting face is about right angles to the reciprocating path of the tool box and cutters, when the cutters are formed integral with the plate of the whole series.

By forming and housing cutters in the manner described, should one of the cutter teeth get damaged, it can be replaced without having to discard the remainder of the series as is necessary when arranged and constucted in a manner such as shown and described in the beforementioned United States patent specification.

What we claim as our invention is:—

Cutters for helical wheel teeth comprising a series of interchangeable teeth of the rack type with holding bars therefor, said bars having their inner faces grooved to correspond with the pitch of the wheel teeth to be cut, the series of teeth being held within said grooves vertically in a cutting position and at an obtuse angle to the length of the holding bars, substantially as described.

In testimony whereof we have set our hands in the presence of two witnesses.

ARTHUR MAURICE MIDGLEY.
SAM SUNDERLAND.

Witnesses:
 CHARLES MACKAY,
 JOHN GILL.